Patented Jan. 25, 1938

2,106,241

UNITED STATES PATENT OFFICE 2,106,241

PROCESS FOR BREAKING PETROLEUM EMULSIONS

Melvin De Groote, St. Louis, Mo., assignor to The Tret-O-Lite Company, Webster Groves, Mo., a corporation of Missouri No Drawing. Application April 10, 1937, Serial No. 136,150

11 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottoms of oil storage tanks, and are commonly referred to as "cut oil", "roily oil", "emulsified oil" and "bottom settlings".

The object of my invention is to provide a novel, inexpensive, and efficient process for separating emulsions of the kind referred to into their component parts of oil and water or brine.

Briefly described, my process consists in subjecting a petroleum emulsion to the action of a demulsifying agent comprising a carboxylic amide or amide body of the kind hereinafter described, thereby causing the emulsion to break down and separate into its component parts of oil and water or brine, when the emulsion is permitted to remain in a quiescent state after treatment, or is subjected to other equivalent separatory procedure. The amide used as the demulsifying agent of my process is characterized by the presence of one or more hydroxyl groups attached to a hydrocarbon radical or radicals in the amino hydrogen position. Such materials may be obtained in various manners as hereinafter described.

It is well known, of course, that amides may be obtained by reaction between long chain carboxy acids and monoalkylolamines, such as monoethanolamine, monopropanolamine, monobutanolamine, etc. The manufacture of such chemical compounds, particularly where derived from higher fatty acids, is described in British patent No. 450,672, dated July 17, 1936, to Orelup. Another procedure which has been employed for the same purpose is to react the monoalkylolamine with the acyl chloride derived from a suitable carboxy acid. Still another procedure employs the use of an alkylene oxide, such as ethylene oxide, propylene oxide, butylene oxide, and the like, in connection with an amide. Reference is made to U. S. Patent No. 2,002,613, dated May 28, 1935, to Orthner and Keppler. This latter method for producing oxy-amides is not limited to the use of alkylolamines such as monoalkylolamine, dialkylolamines, or the like, as the raw material, but may employ alkylamines, arylamines, aralkylamines, alicyclic amines, etc. so as to obtain hydroxylated derivatives. Naturally the methods employing monoalkylolamines, and particularly the process in which acyl chlorides are employed, may also use such materials as diethanolamine, dipropanolamine, dibutanolamine, and the like. Amides so obtained may have as many as six hydroxyl radicals in the amino hydrogen position.

It is also known that when primary and secondary amines are reacted with various alkylene oxides, one may obtain hydroxy ethyl alkylamines, hydroxy propyl alkylamines, etc. The reaction, for example, between a primary amine and ethylene oxide, yields a material of the formula type $HO.CH_2.CH_2.NHR$. Such amines may be reacted with detergent-forming carboxy acids to give suitable amides, which in turn may be reacted with suitable polybasic carboxy acids.

The various amides or esterified amide bodies of the kind employed as demulsifying agents in the present process are derived most readily from detergent-forming carboxylic acids. Detergent-forming carboxylic acids are of the type of acids which combine with alkalies, such as caustic soda or caustic potash to produce soap or soap-like bodies. Well known examples of such detergent-forming acids are fatty acids, such as oleic acid, stearic acid, etc., as well as abietic acid, and various naphthenic acids. Petroleum carboxy acids are also derived by the oxidation of paraffin or petroleum wax and may be used to produce the treating agent contemplated by my process, provided that they are characterized by the fact that they combine with alkalies to form soap or soap-like materials.

Obviously, the detergent acid of the type RCOOH, which supplies the acyl radical R—CO, may be subjected to any suitable modification which does not destroy its ability to form a soap or soap-like body. For instance, oleic acid may be chlorinated, and one might employ such chlorinated oleic acid instead of oleic acid, in producing the treating agent used in my process. Ricinoleic acid may be sulfated to produce sulforicinoleic acid, and this particular material may be employed. Rosin might be hydrogenated and such hydrogenated abietic acid might be employed. Naphthenic acids may be brominated, and such brominated naphthenic acids may be employed. In all cases, the modified form must still possess the detergent-forming characteristic of the unaltered parent acid. The words "detergent-forming acid" will hereafter be used in the sense to include not only such materials as naphthenic acids, fatty acids, abietic acids, etc., but also their modifications of the kind indicated as being equally suitable.

Typical of some of the amides which may be employed as demulsifying agents in the present process, are the following:

R—CO—NR'CH₂CH₂OH or

R—CO—NH—C₂H₄—OH or

R—CO—NH—CHOH—CH₂OH or

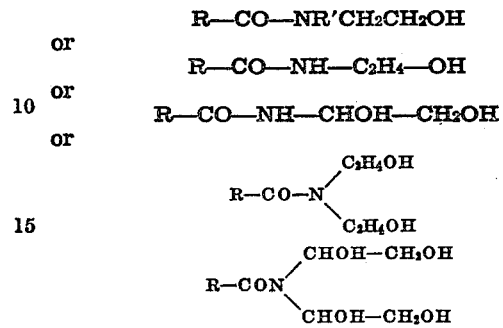

In the above formulas, R denotes a hydrocarbon or oxyhydrocarbon radical derived from a detergent-forming carboxy acid, and R' denotes an alkyl radical.

It has been pointed out that suitable amides are obtainable from hydroxyalkyl-alkylamines, which in turn may be considered as derivaties of alkylene oxides or chlorhydrins, as illustrated by the following reactions:

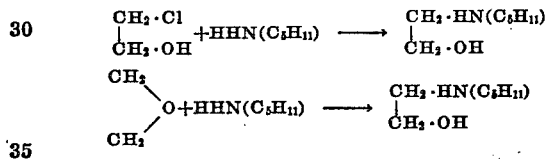

Reference is made to U. S. Letters Patent No. 2,042,621, dated June 2, 1936, to Olin. This particular patent discloses the manufacture of amines comparable to those described immediately above, but derived from a trihydric alcohol as the ultimate parent material, instead of being derived from a dihydric alcohol as the parent material. Ethylene oxide and ethylene chlorhydrin, for example, may be classified as derivatives of glycol. One of the materials there described, for example, is 1-mono-amyl amino propane-2, 3-diol (1-mono-amyl amino-2-hydroxy-3-propanol), which is of the following formula:

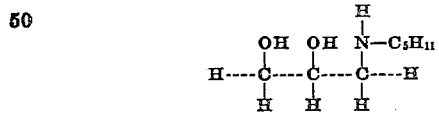

Similar materials are obtainable from glycidol and also are obtainable from alcohol ethers, such as diglycerol, diethylene glycol and the like, instead of from the glycols, glycerol, and the like. Other comparable materials include 1-mono benzyl amino propane-2, 3-diol, which is of the following formula:

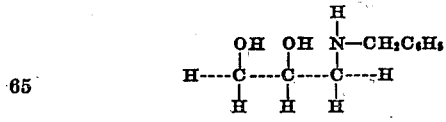

Similar derivatives are obtainable from an alicyclic amine, such as cyclohexylamine, methylcyclohexylamine, and the like, by reacting such amines with glycerol monochlorhydrin and the like.

It is to be noted that one might employ a diamide. If two moles of a detergent-forming carboxy acid body, for instance, a fatty acid chloride, are united with one mole of an alkylolamine, for example, one may obtain a compound indicated by the following type formula:

(R—CO)₂NC₂H₄OH

The product which comprises or constitutes the demulsifying agent of the present process may be characterized in its broadest aspect by the following formula:

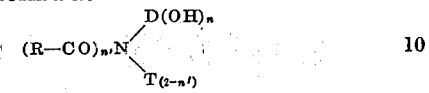

in which $n$ and $n'$ represent the numerals one or two; D is a divalent or trivalent hydrocarbon radical; and T represents a hydrogen atom or a monovalent hydrocarbon radical, particularly an alkyl radical, or it may represent the same radical as D(OH)$_n$, and R—CO represents the acyl radical of a detergent-forming carboxy acid.

It has been previously pointed out that the detergent-forming carboxy acid may of itself be modified by the introduction of some other substituent atom or radical in the hydrocarbon chain. Particularly effective reagents are obtained by introduction of sulfo radicals into the hydrocarbon chain or the oxy-hydrocarbon chain of the detergent-forming carboxy acid. It is well known, of course, that oleic acid, for example, can be treated with sulfuric acid at relatively low temperatures (35° C. or less) to produce oleic acid hydrogen hydrogen sulfate. This material may also be designated as hydrogen sulfate stearic acid and is sometimes referred to as sulfostearic acid or sulfo-oleic acid. In essence, sulfuric acid splits as indicated in the following reaction:

HHSO₄→H+HSO₄ and the ethylene linkage of oleic acid or the like is saturated by the addition of the hydrogen atom and an HSO₄ radical.

Similarly, acid sulfates may be derived from hydroxylated fatty acids, such as ricinoleic acid, hydroxystearic acid, diricinoleic acid, and the like, by reactions involving the alcoholiform hydroxyl and sulfuric acid as indicated by the following reaction:

COOH.R'.OH+H.HSO₄

True sulfonic acids can be derived from materials such as oleic acid in various manners, such as treating oleic acid with sulfuric acid at or near the boiling point of water. In such instances the reaction may be considered as if sulfuric acid splits as indicated by the following reaction:

OHHSO₃→OH+HSO₃ and as if the ethylene linkage were saturated by the introduction of an OH radical and an HSO₃ radical.

Still another suitable procedure is to treat a hydroxylated or unsaturated fatty acid or the like with equal molecular amounts of a suitable aromatic, such as phenol, benzene, napthalene, and the like, in the presence of an excess of a sulfonating agent, such as sulfuric acid. This is the typical reaction for the production of sulfo-aromatic fatty acids commonly referred to as Twitchell reagents. In such instances, the ethylene linkage is substituted by a hydrogen atom and a sulfo-aromatic radical or else the alcoholic hydroxyl radical attached to the carbon chain is replaced by a sulfo-aromatic radical. All these various sulfo fatty acids previously described are well known compositions of matter and their method of manufacture is well known. The product obtained from oleic acid and phenol, for example, is commonly referred to as sulphenolstearic acid and its composition is indicated by the following formula:

$C_6H_3OH.HSO_3.C_{17}H_{34}COOH$

It is further emphasized that the present process is concerned with reagents of the kind fully described and is not dependent on any particular way in which the said reagents are obtained, except when specifically so stated. They may be produced in any suitable manner. Any isomeric form may be employed. As far as I am aware, one isomeric form is as suitable as another. It is also obvious that any functional equivalent of any compound which obviously acts in the same manner as the compound itself is just as suitable as the unaltered material. For instance, the chlorinated amide derived from the oleic acid dichloride is just as suitable as the amide derived from oleic acid. An amine in which a chloralkyl radical replaces an alkyl radical is just as satisfactory as if the unaltered alkyl radical were present in the amine.

United States Patent No. 2,034,941, to DeGroote, Keiser and Wirtel, dated March 24, 1936, described a demulsifying agent obtained by oxidation of ricinoleic acid. I have found that if such oxidized ricinoleic acid is converted into an amide of the kind previously described, that the reagent so obtained is a specially effective demulsifying agent and it is the one which I prefer to employ in practising my process. The production of such oxidized ricinoleic acid is described in detail on page 3 of the specification of said DeGroote et al. patent.

My preferred reagent is obtained by reacting approximately 325 pounds of blown ricinoleic acid with approximately 110 pounds of diethanolamine, so as to eliminate the water formed by chemical combination. Such material will show at least slight water solubility and, in some instances, provided that the ricinoleic acid has been sufficiently blown, may show marked water solubility. In some instances, it may be desirable to increase the amount of diethanolamine employed for combination or to replace the diethanolamine by an equivalent amount of 1-mono-amyl amino-2,3-diol.

Another reagent which is just as suitable for breaking various oil field emulsions may be derived from any suitable sulfo detergent acid of the kind described and particularly from a sulfoaromatic fatty acid. For instance, if sulfophenolstearic acid is neutralized with caustic potash so that it is no longer acid to methyl orange indicator, then only the acidic hydrogen atom of the sulfonic group is replaced by a potassium atom. Such acid potassium salt after dehydration may then be substituted in proper amount for the blown ricinoleic acid described previously. In a general way, a little less than 500 lbs. of the dehydrated acid potassium salt will replace the 325 lbs. of blown ricinoleic acid.

The amides employed in the present process are free from resinoid properties even when there is no substitution in the hydrocarbon chain of the acyl group. Certain demulsifying agents having resinoid properties have been described for use in breaking oil field emulsions. Such resinoid materials are characterized by the fact that upon heating the same, they produce a synthetic resin, unless such resinification is prevented or modified by the presence of a protective colloid or a solvent, or a modifying group, such as a fatty acid group or a sulfo group. The amides of the kind employed in the present process are entirely devoid of resinoid properties. Even in absence of any substituent in the hydrocarbon chain of the acyl group, they can be heated just below their point of decomposition for an indefinite period without changing their physical structure. They do not have present any solvent which retards resinification. They may have present a sulfo radical but such sulfo radical does not prevent resinification, for reasons previously indicated. They do not have present any protective colloid which retards resinification. They are devoid of typical resinophore radicals, such as aldehydic radicals, unaltered phenolic radicals, etc. The acyl group present cannot be considered as a modifying group preventing resinification, because if the acyl group were eliminated, one has present an amine residue or an ammonium residue which obviously is not resinoid or resin-forming in character, in absence of some other group or radical.

Conventional demulsifying agents employed in the treatment of oil field emulsions are used as such, or after dilution with any suitable solvent, such as water; petroleum hydrocarbons, such as gasoline, kerosene, stove oil; a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohols, butyl alcohols, hexyl alcohols, octyl alcohols, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of my process may be admixed with one or more of the solvents customarily used in connection with conventional demulsifying agents. Moreover, said material or materials may be used alone or in admixture with other suitable well known classes of demulsifying agents, such as demulsifying agents of the modified fatty acid type, the petroleum sulfonate type, the alkylated sulfo-aromatic type, or the like.

It is well known that conventional demulsifying agents may be used in a water-soluble form, or in an oil-soluble form, or in a form exhibiting both oil and water solubility. Sometimes they may be used in a form which exhibits relatively limited water solubility and relatively limited oil solubility. However, since such reagents are sometimes used in a ratio of 1 to 10,000, or 1 to 20,000, or even 1 to 30,000, such an apparent insolubility in oil and water is not significant, because said reagents undoubtedly have solubility within the concentration employed. This same fact is true in regard to the material or materials employed as the demulsifying agent of my process.

I desire to point out that the superiority of the reagent or demulsifying agent contemplated in my process is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but I have found that such a demulsifying agent has commercial value, as it will economically break or resolve oil field emulsions in a number of cases which cannot be treated as easily or at so low a cost with the demulsifying agents heretofore available.

In practising my process, a treating agent or demulsifying agent of the kind above described may be brought in contact with or caused to act upon the emulsion to be treated in any of the various ways, or by any of the various apparatus now generally employed to resolve or break petroleum emulsions with a chemical reagent, or may be employed co-jointly in combination with other non-chemical processes intended to effect demulsification. After treatment, the emulsion is allowed to stand in a quiescent state, usually in a settling tank at a temperature not in excess of 200° F., so as to permit the water or brine to separate from the oil, it being preferable to keep the temperature low enough to prevent volatilization of the valuable constituents of the oil.

Having thus described my invention, what I claim as new and desire to secure by Letters Patent is:

1. A process for breaking a petroleum emulsion of the water-in-oil type, which consists in subjecting the emulsion to the action of a demulsifying agent comprising an amide of the formula type:

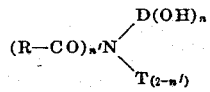

in which $n$ and $n'$ represent the numerals one or two, D is a hydrocarbon radical; and T represents a non-ionizable hydrogen atom equivalent selected from the class consisting of a hydrogen atom, a monovalent hydrocarbon radical, and a hydroxylated hydrocarbon radical having not more than two hydroxyl radicals as a part thereof; and R—CO represents the acyl radical of a detergent-forming carboxy acid.

2. A process for breaking a petroleum emulsion of the water-in-oil type, which consists in subjecting the emulsion to the action of a demulsifying agent comprising an amide of the formula type:

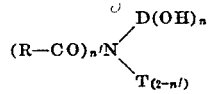

in which $n$ and $n'$ represent the numerals one or two, D is a hydrocarbon radical; and T represents a non-ionizable hydrogen atom equivalent selected from the class consisting of a hydrogen atom, a monovalent hydrocarbon radical, and a hydroxylated hydrocarbon radical having not more than two hydroxyl radicals as a part thereof; and R—CO represents the acyl radical of a rosin acid.

3. A process for breaking a petroleum emulsion of the water-in-oil type, which consists in subjecting the emulsion to the action of a demulsifying agent comprising an amide of the formula type:

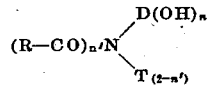

in which $n$ and $n'$ represent the numerals one or two, D is a hydrocarbon radical; and T represents a non-ionizable hydrogen atom equivalent selected from the class consisting of a hydrogen atom, a monovalent hydrocarbon radical, and a hydroxylated hydrocarbon radical having not more than two hydroxyl radicals as a part thereof; and R—CO represents the acyl radical of a petroleum acid.

4. A process for breaking a petroleum emulsion of the water-in-oil type, which consists in subjecting the emulsion to the action of a demulsifying agent comprising an amide of the formula type:

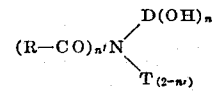

in which $n$ and $n'$ represent the numerals one or two, D is a hydrocarbon radical; and T represents a non-ionizable hydrogen atom equivalent selected from the class consisting of a hydrogen atom, a monovalent hydrocarbon radical, and a hydroxylated hydrocarbon radical having not more than two hydroxyl radicals as a part thereof; and R—CO represents the acyl radical of a fatty acid.

5. A process for breaking a petroleum emulsion of the water-in-oil type, which consists in subjecting the emulsion to the action of a demulsifying agent comprising an amide of the formula type:

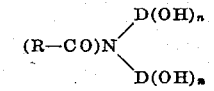

in which $n$ represents the numerals one or two; D is a divalent or trivalent hydrocarbon radical; and R—CO represents the acyl radical of a fatty acid.

6. A process for breaking a petroleum emulsion of the water-in-oil type, which consists in subjecting the emulsion to the action of a demulsifying agent comprising an amide of the formula type:

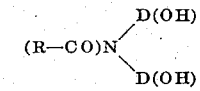

in which D is a divalent hydrocarbon radical; and R—CO represents the acyl radical of a fatty acid.

7. A process for breaking a petroleum emulsion of the water-in-oil type, which consists in subjecting the emulsion to the action of a demulsifying agent comprising an amide of the formula type:

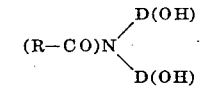

in which D is a $C_2H_4$ radical; and R—CO represents the acyl radical of a fatty acid.

8. A process for breaking a petroleum emulsion of the water-in-oil type, which consists in subjecting the emulsion to the action of a demulsifying agent comprising an amide of the formula type:

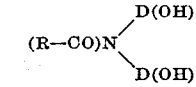

in which D is a $C_2H_4$ radical; and R—CO represents the acyl radical of an unsaturated fatty acid.

9. A process for breaking a petroleum emulsion of the water-in-oil type, which consists in subjecting the emulsion to the action of a demulsifying agent comprising an amide of the formula type:

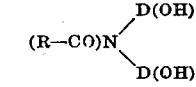

in which D is a $C_2H_4$ radical; and R—CO represents the acyl radical of a ricinoleic acid.

10. A process for breaking a petroleum emulsion of the water-in-oil type, which consists in subjecting the emulsion to the action of a demulsifying agent comprising an amide of the formula type:

$$(R-CO)N\begin{matrix}D(OH)\\D(OH)\end{matrix}$$

in which D is a $C_2H_4$ radical; and R—CO represents the acyl radical of oxidized ricinoleic acid.

11. A process for breaking a petroleum emulsion of the water-in-oil type, which consists in subjecting the emulsion to the action of a demulsifying agent comprising an amide of the formula type:

$$(R-CO)N\begin{matrix}D(OH)\\D(OH)\end{matrix}$$

in which D is a $C_2H_4$ radical; and R—CO represents the acyl radical of ricinoleic acid and additionally characterized by the presence of a sulfo radical in the acyl group.

MELVIN DE GROOTE.